J. MACIEJEWSKI.
HOG FEEDING DEVICE.
APPLICATION FILED JULY 18, 1919.

1,367,614.

Patented Feb. 8, 1921.
4 SHEETS—SHEET 3.

Inventor
J. Maciejewski

J. MACIEJEWSKI.
HOG FEEDING DEVICE.
APPLICATION FILED JULY 18, 1919.
1,367,614.
Patented Feb. 8, 1921.
4 SHEETS—SHEET 4.
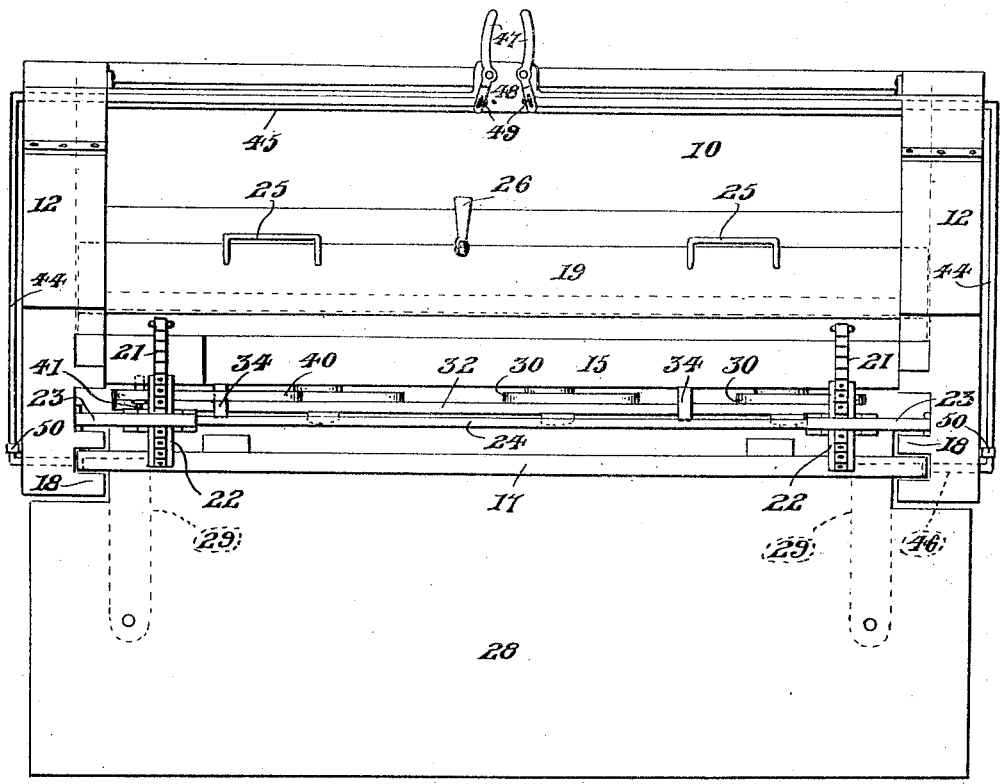
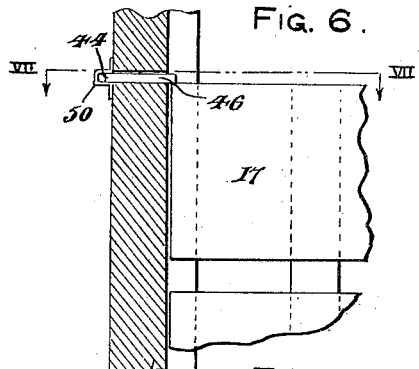
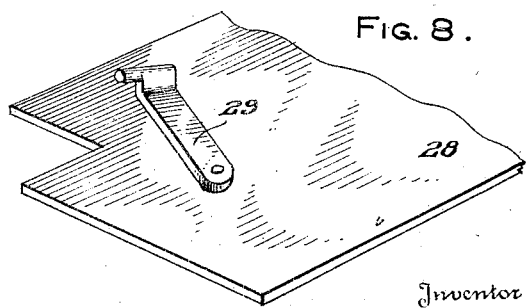
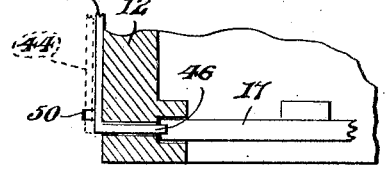
Inventor
J. Maciejewski
By
Attorney

UNITED STATES PATENT OFFICE.

JOSEPH MACIEJEWSKI, OF KRAKOW, WISCONSIN.

HOG-FEEDING DEVICE.

1,367,614.  Specification of Letters Patent.  Patented Feb. 8, 1921.

Application filed July 18, 1919. Serial No. 311,800.

*To all whom it may concern:*

Be it known that I, JOSEPH MACIEJEWSKI, a citizen of Poland, residing at Krakow, in the county of Shawano and State of Wisconsin, have invented certain new and useful Improvements in Hog-Feeding Devices, of which the following is a specification.

The primary object of the invention is to provide a feeding device for swine and other animals whereby a number of animals may be easily and quickly fed at the same time, provision being made to prevent waste as well as to regulate the rapidity of the feeding operation.

A further object of the invention is to provide a swine feeding device in which the feed may be placed out of reach of the animals to be fed, means being provided for accommodating animals of different sizes accessible to the feed when desired, the structure possessing great strength and easily operable by the workmen.

A still further object of the invention is to provide a stock feeding device whereby the feed may be readily deposited out of reach of the animals, the animals being given access thereto whenever desired, the spilling of the feed being thereby prevented while adjustable obstructions prevent the animals from devouring the feed too rapidly.

With these general objects in view the invention consists of the novel combination and arrangement of parts hereinafter more fully described in connection with the accompanying drawings and in which like reference characters designate corresponding parts throughout the several views.

Figure 4:
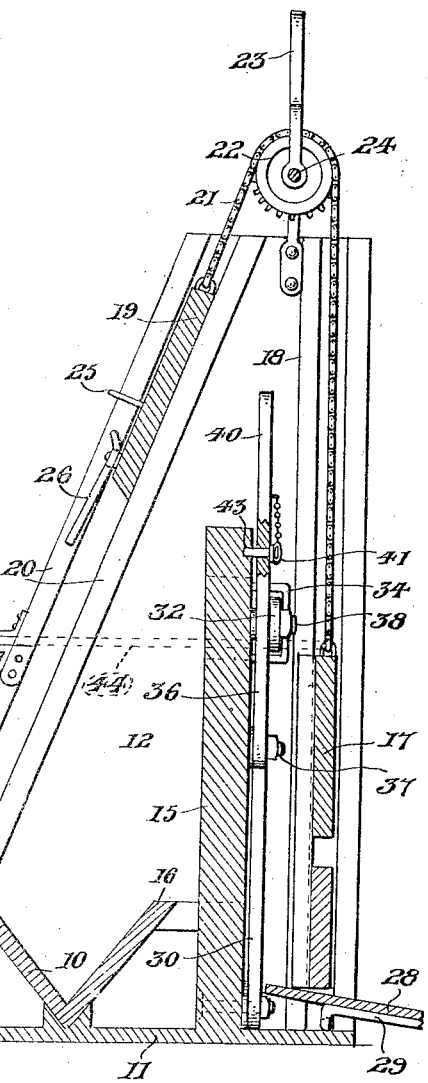

Fig. 4 is a similar sectional view with the device positioned for receiving feed inaccessible to the animals to be fed, Fig. 5 is a top plan view thereof, Fig. 6 is a vertical detail sectional view taken through a side portion of the device showing one of the locking members in its engaging position, Fig. 7 is a view thereof in horizontal section taken upon line VII—VII of Fig. 6, and Fig. 8 is a perspective detail view of a corner portion of an approach-board for the animals.

My invention broadly comprises a feed trough 10 mounted upon a base 11 between upright ends 12 adapted to receive feed over the rear edge 13 of the trough for animals approaching the trough through head receiving openings 14 of a barrier 15 adjacent the front edge 16 of said trough 10. A gate 17 slidable between guides 18 adjacent the forward edges of the ends 12 is adapted for lowering for preventing access to the trough 10 through the openings 14 during the placing of feed in the trough as shown in Fig. 4 of the drawings.

A slide plate 19 is adjustably positioned in guides 20 at the rear edges of the ends 12 connected to the gate 17 by means of chains 21 passing over sprocket wheels 22 in brackets 23 projecting inwardly of the tops of said ends 12. A connecting rod 24 is preferably provided between the brackets 23 and it will be apparent that upon moving the plate 19 upwardly and downwardly by means of the handles 25 carried by said plate that the gate 17 will simultaneously move downwardly and upwardly or in an opposite direction with respect to the plate.

Figure 1:
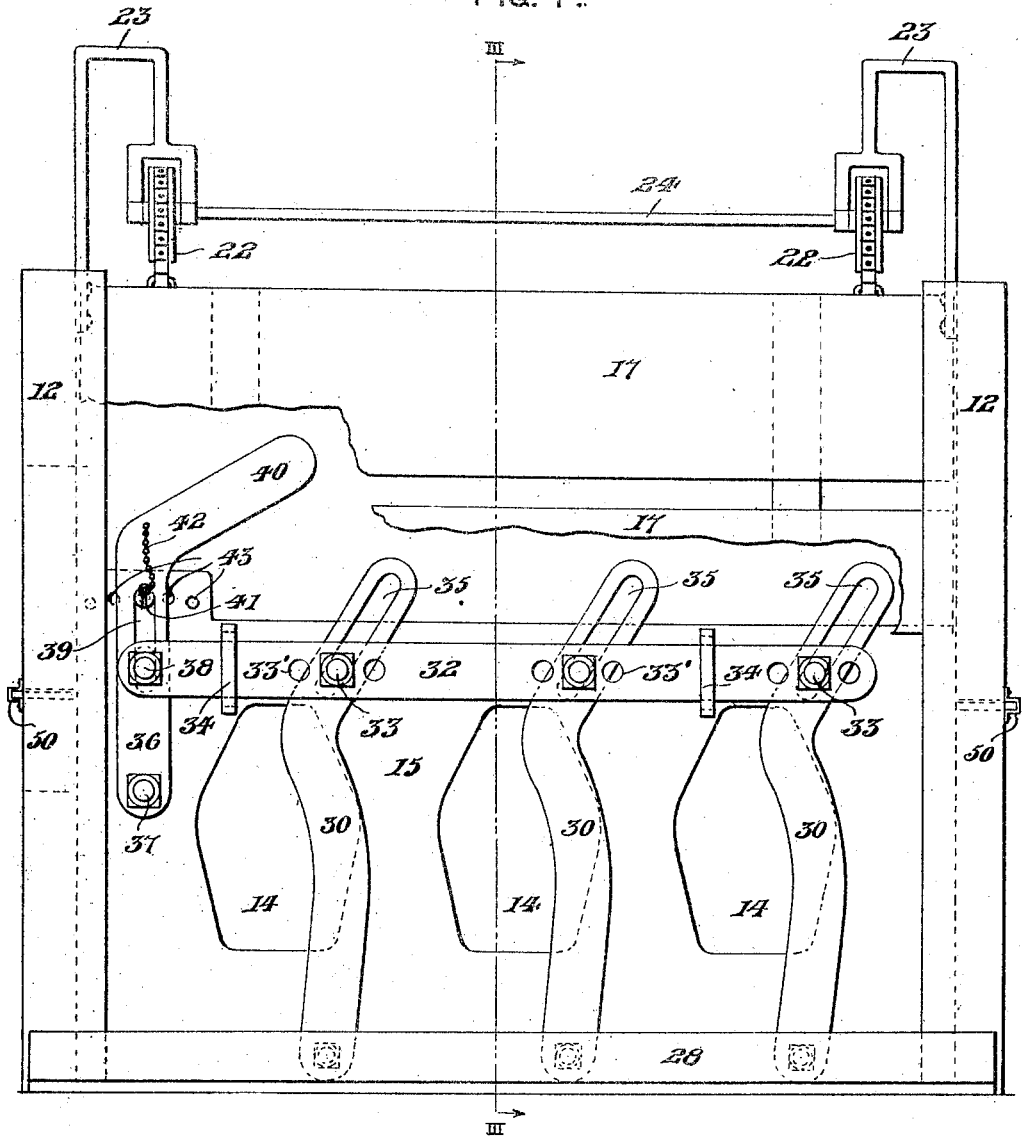
Figure 1 is a front elevational view of the invention with parts broken away.
Figure 2:
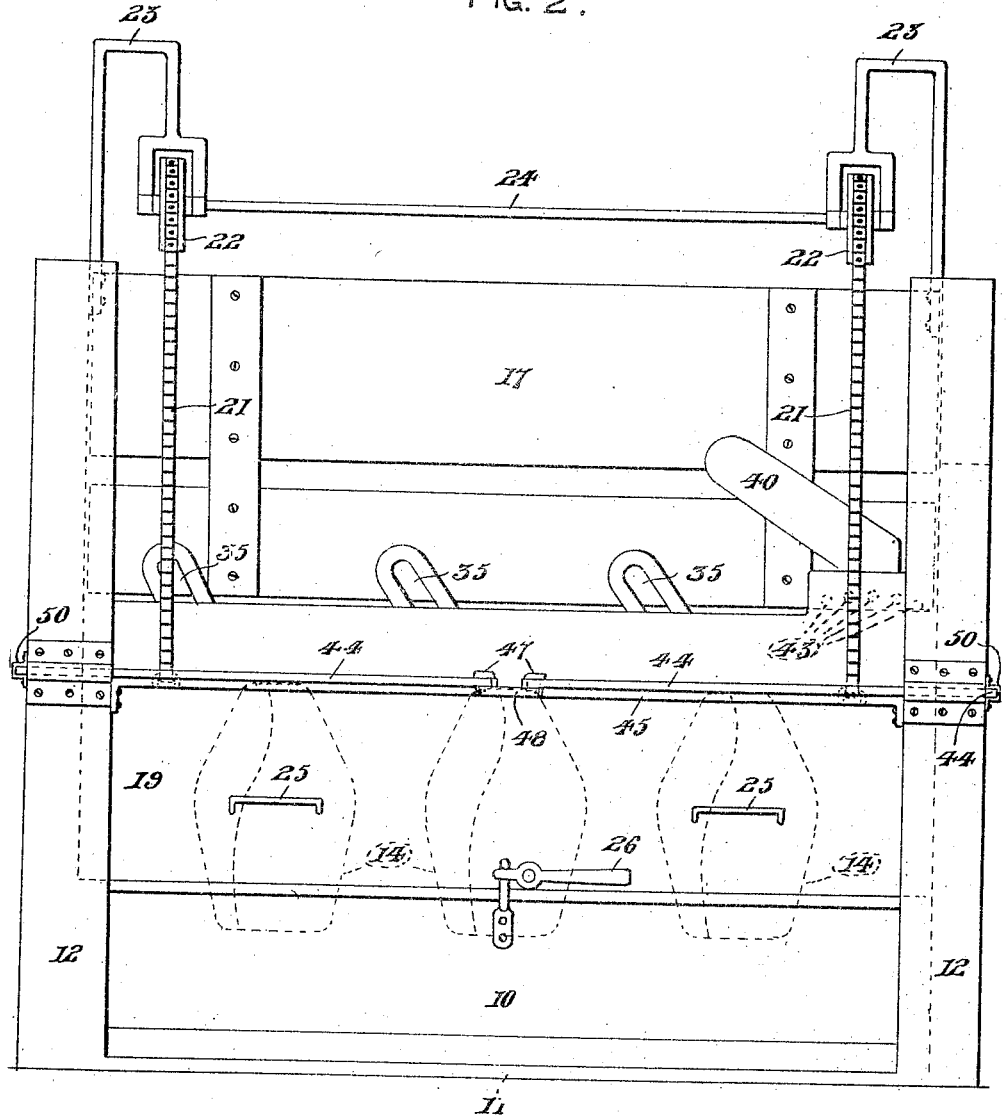
Fig. 2 is a rear elevation thereof.
Figure 3:
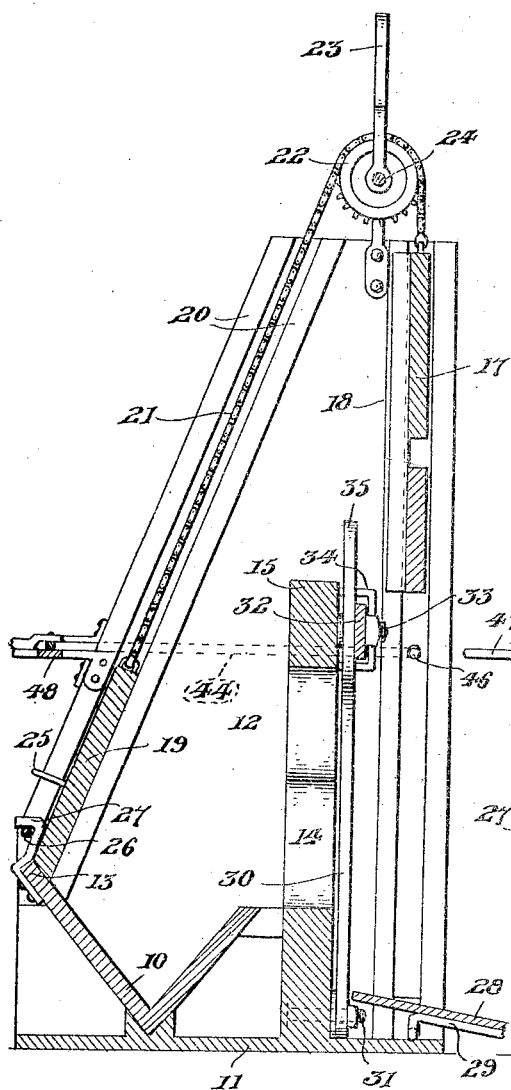
Fig. 3 is a vertical central sectional view taken upon line III—III of Fig. 1.

When it is desired to fill the trough 10 with feed, the plate 19 is elevated permitting free access to the trough rearwardly of the device while the gate 17 being lowered prevents the animals from obtaining access to the trough. Whenever desired to feed the animals, the plate 19 is lowered into contact with the rear portion of the trough and maintained in this position with the gate 17 elevated by means of a latch 26 pivoted to the plate 19 for locking engagement beneath the hook 27 upon the rear edge 13 of the trough. An approach-board 28 is removably mounted at an inclination between the opposite pairs of guides 18 forwardly of the barrier 15 having swinging hooks 29 for fitting between the guides 18 when the approach-board is in position for use as best illustrated in Figs. 3 and 4 of the drawings. The gate 17 substantially rests upon the board 28 when the gate is lowered and when the gate is elevated, the animals on the board 28 may reach through the openings 14 and eat the feed out of the trough 10.

Guards 30 are pivoted by bolts 31 adjacent the bottom of the barrier 15 for swinging laterally of the openings 14 and thereby regulating the size of said openings for the more or less free passage of the heads of the animals through the openings as well as to accommodate the feeding device more perfectly for animals of different sizes. A connector 32 slidable in brackets 34 upon the barrier 15 is adjustably connected to the guards 30 by means of bolts 33 passing through suitable openings 33' in the connector 32 and through slots 35 in the upper angular ends of said guards 30. An operating lever 36 is pivoted as at 37 to the barrier 15 loosely connected by a bolt 38 carried by the connector 32 within a slot 39 of the said lever 36. It will be evident that upon shifting the lever 36 by means of its upper angular end 40, the connector 32 will be longitudinally moved for simultaneously adjusting the guards 30 relatively of the openings 14. A pin 41 is connected by a chain 42 with the lever 36 adapted for positioning through the slot 39 for selectively seating in sockets 43 of the barrier 15 when the guards 30 are adjusted as found desirable.

Substantially U-shaped frames 44 are carried by the ends 12 and a rear brace 45 connected between said ends, the forward inwardly projecting terminal portions 46 of the frames constituting locking means adapted for projecting between the pairs of guides 18 within the path of movement above the gate 17 when the gate is lowered. Operating handles 47 upon a central portion 48 of the brace 45 are operatively connected as at 49 with the adjacent portions of the frames 44 whereby movements of the handles 47 toward each other or inwardly results in outwardly moving or projecting the locking portions 46 thereby releasing the gate 17. Limiting straps 50 upon the outer sides of the ends 12 overlie the frames 44, limiting the outward movement thereof. The complete operation of the invention will be fully understood from this detail description thereof, the animals being prevented from interfering with the deposit of food in the trough 10 by lowering the gate 17 and locking the same by the frame 44. When desired to prevent the animals from eating too rapidly, the guards 30 are shifted as far overlying the openings 14 as desired and permitting only portions of the animals' heads to enter the trough 10. While the form of the invention herein set forth is believed preferable it will be understood that minor changes may be made therein without departing from the spirit and scope thereof.

What I claim as new is:—

1. A feeding device comprising a trough, a gate and a plate reversely shiftable adjacent the opposite sides of the trough, and operating connections between the said plate and gate.

2. A feeding device comprising a trough, a gate and a plate reversely shiftable adjacent the opposite sides of the trough, operating connections between the said plate and gate, and a barrier between said trough and the path of movement of the gate having a plurality of openings therethrough adapted for accommodating animals therethrough to the said trough.

3. A feeding device comprising a trough, a gate and a plate reversely shiftable adjacent the opposite sides of the trough, operating connections between the said plate and gate, a barrier between said trough and the path of movement of the gate having a plurality of openings therethrough adapted for accommodating animals therethrough to the said trough, simultaneously adjustable guards for said openings carried by the barrier, and adjustable retaining means for the said guards.

4. A device of the class described comprising a base, ends upon the base, a feed trough between said ends upon the rear portion of the base, a barrier upon the base forwardly of the trough having head receiving openings therethrough, guards adapted for swinging relatively of the openings pivoted to the barrier, simultaneous operating means for said guards, a removable approach-board forwardly of the barrier detachably mounted adjacent the forward edge of the base, a gate vertically slidable between the forward edge portions of said ends, a slide plate shiftable between the rear portions of the ends, sprockets carried by the ends above the plane of said barrier, and chains passing over said wheels connected between the upper sides of said gate and plate.

5. A device of the class described comprising a base, ends upon the base, a feed trough between said ends upon the rear portion of the base, a barrier upon the base forwardly of the trough having head receiving openings therethrough, guards adapted for swinging relatively of the openings pivoted to the barrier, simultaneous operating means for said guards, a removable approach-board forwardly of the barrier detachably mounted adjacent the forward edge of the base, a gate vertically slidable between the forward edge portions of said ends, a slide plate shiftable between the rear portions of the ends, sprockets carried by the ends above the plane of said barrier, chains passing over said wheels connected between the upper sides of said gate and plate, frames carried by said ends having inwardly projecting portions overlying the gate when the frames are at the inward limit of their movement, operating handles for the frames above the level and rearwardly of said trough, and locking connections between said plate and trough adapted for operation when the gate is elevated.

In testimony whereof I affix my signature.

JOSEPH MACIEJEWSKI.